R. P. WHITE.

JAR.

APPLICATION FILED AUG. 14, 1916.

Reissued Jan. 30, 1917. 14,254.

Witnesses:
Robert H. Weir
Arthur W. Carlson

Inventor
Richard P. White
Pope Bain May
Attys.

UNITED STATES PATENT OFFICE.

RICHARD P. WHITE, OF CHICAGO, ILLINOIS.

JAR.

14,254. Specification of Reissued Letters Patent. Reissued Jan. 30, 1917.

Original No. 1,191,634, dated July 18, 1916, Serial No. 70,764, filed January 7, 1916. Application for reissue filed August 14, 1916. Serial No. 114,919.

*To all whom it may concern:*

Be it known that I, RICHARD P. WHITE, a citizen of the United States, and a resident of the city of Chicago, in the county of Cook and State of Illinois, have invented a certain new and useful Improvement in Jars; and I do hereby declare that the following description of my said invention, taken in connection with the accompanying sheet of drawing, forms a full, clear, and exact specification, which will enable others skilled in the art to which it appertains to make and use the same.

My invention relates generally to improvements in jars, particularly stoneware jars, and it consists, essentially, in the novel and peculiar combination of parts and details of construction, as hereinafter first fully set forth and described and then pointed out in the claims.

In present day stoneware jars, the bail ears attached to or integrally formed with the jar proper in the process of pottery making, and intended for the reception of the carrying bails, now project considerably beyond the outer outline of the jar, and are very susceptible of being broken or knocked off in transit or in use.

Therefore, the object of my invention is to so construct a stoneware jar and the bail ears thereon, as to practically eliminate the breakage of these ears whether in transit or in use; to produce a much stronger and a much more sightly bail ear; and, to provide a bail of greater strength and stiffness and one which will lie close to the body of the jar when in operative position.

Figure 1:
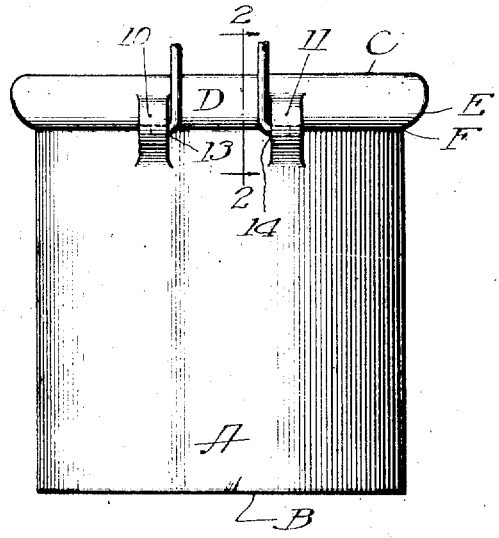
Figure 2:
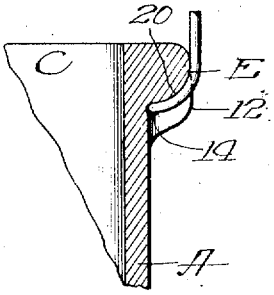
Figure 3:
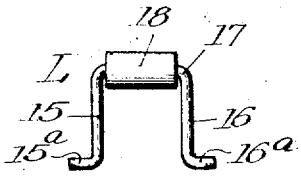
Figure 4:
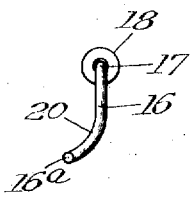

In the drawing made a part hereof, which discloses my invention more fully, Figure 1 is an elevation of a stoneware jar in which my invention is incorporated. Fig. 2 is a section of a fragment in line 2—2 of Fig. 1. Fig. 3 is a front elevation of the bail proper. Fig. 4 is a side view of the said bail.

Like parts are indicated by corresponding characters or symbols of reference in all the figures of the drawing.

Stoneware jars of the general class indicated are usually comprised of a burnt, glazed, cylindrical shell A, manufactured from pottery ware and having a bottom B and an open top C. Surrounding the shell A, along the upper edge thereof, there is provided a marginal bead D, integrally formed with the shell A, and having its exterior contour of arcuate shape, as seen at E Figs. 1 and 2. In cross-section, this bead curves into the body of the shell A and terminates therein in a continuous, sharp corner F, as indicated in Fig. 1.

Formed integrally with the bead D, and the shell A, and extending parallel to said shell, are provided, at suitable points, pairs of ears 10 and 11, and attention is now particularly drawn to the fact that the outer edges 12, Fig. 2, of the ears 10 and 11 are tangent to the bead D, so that no portions of the said ears project beyond the bead in the embodiment shown; thereby eliminating any tendency of accidentally knocking or breaking off the ears by contact thereof with adjacent objects. These ears 10 and 11 are transversely punctured or apertured at 13 and 14, and these apertures are so located that the inner peripheries thereof are tangent to the exterior of the shell and the bead D, substantially at the sharp corner F, so that these apertures are positioned in the strongest as well as the least exposed portions of the ears.

The bails constituting the carrying media of my improved jar, include a U-shaped wire L, possessed of a pair of substantially parallel, vertical legs 15 and 16, connected together at one end by a wire 17, upon which is mounted a wood, or the like, handle 18, and having the opposite ends of said legs provided with oppositely projecting, horizontal ends 15ᵃ and 16ᵃ, which ends are adapted for entrance into the openings 13 and 14 as means for quickly and conveniently attaching the bails, or handles by which the jar is supported when being carried by means of the bails. It is now to be pointed out that the lower ends of the legs 15 and 16 of the bail or bails L, are arcuately bent at 20, to fit the curvature of the bead D, so that in carrying or supporting position, the said legs of the bail or bails rest against and are fitted to the curve of the bead D, thereby imparting a much greater degree of strength and stiffness not only to the bail or bails but also to the bail ears than is now possible. It may now be explained that the bail ears 10 and 11 are arranged in pairs and that the bails L have their legs fitted between adjacent ears, by allowing the ends 15ᵃ and 16ᵃ to spring or snap into the openings 13 and 14, respectively.

I have hereinbefore disclosed the preferred mode of practising my invention, but I reserve the right to make such and any changes as might occur to one skilled in the art to which this invention appertains, or to make any and all alterations as may be permitted under the doctrine of equivalents.

Having thus fully described my invention I claim as new, and desire to secure to myself by Letters Patent of the United States:

1. A jar, including a shell having a bottom and an open top, an integrally-formed bead along the upper edge of said shell, pairs of bail-ears depending from said bead, said bail-ears being formed integrally with said bead and said shell, and extending longitudinally of said shell, the outer marginal edges of said ears being tangent to the outermost surface of said bead, there being bail-openings through said ears, the marginal edges of said openings being tangent to said shell, and bails pivoted to said ears in said openings.

2. A jar, including a shell having a bottom and an open top, an integrally-formed marginal bead along the upper edge of said shell, there being formed a sharp corner along the lower surface of said bead at its junction with said shell, pairs of bail-ears depending from said bead, said bail-ears being formed integral with said shell, and extending longitudinally of said shell, the outer margins of said ears being tangent to the outermost surface of said bead, there being bail-openings through said ears, the marginal edges of said openings being adjacent to said corners and tangent to said shell and to the lower surface of said bead, arcuate bails, the lower ends of said bails being pivoted in said openings and partly embracing said bead, whereby when said bails are in righted position, the same will be reinforced by said beads and when swung down the free end of said bail will be maintained away from said shell.

3. In combination with a jar of frangible material, having a laterally projecting marginal bead integral therewith and two pairs of symmetrically disposed, spaced-apart, integral bail ears, projecting laterally from the jar within the plan area of the bead, said ears having transversely extending openings to receive the ends of carrying bails, there being one pair of ears on each side of a diametric plane, each pair to accommodate an attachable carrying bail and a bail for engagement with each pair of ears.

4. In combination with a jar of frangible material, an annular bead projecting outwardly from the mouth thereof and integral therewith, a bail ear integral with the jar and pierced transversely by a bail receiving opening, said ear projecting outwardly from the wall of the jar beneath the bead and lying entirely within the plan area of said bead.

5. In combination with a jar of frangible material having an annular bead projecting outwardly from the mouth thereof, a bail ear projecting from the jar below the bead, and a bail having its lower end secured to the ear pivotally on a horizontal axis at a point within the plan area of the bead, the bail intermediate its lower and upper ends being curved outwardly and upwardly to extend above the bead.

6. In combination with a jar of frangible material having an annular bead projecting outwardly from the mouth thereof, a bail ear projecting from the jar below the bead, said ear having a transverse perforation therein positioned within the plan area of the bead, and a U-shaped bail having its lower ends turned for engagement with the perforation, the bail intermediate its lower and upper ends being curved outwardly and upwardly to extend above the bead, the curved portion conforming to the curvature of the bead for engagement therewith.

In testimony that I claim the foregoing as my invention, I have hereunto set my hand.

RICHARD P. WHITE.